Dec. 7, 1954    L. BULTMAN    2,696,309
ROTARY DRUM FILTER
Filed June 22, 1950    2 Sheets-Sheet 2
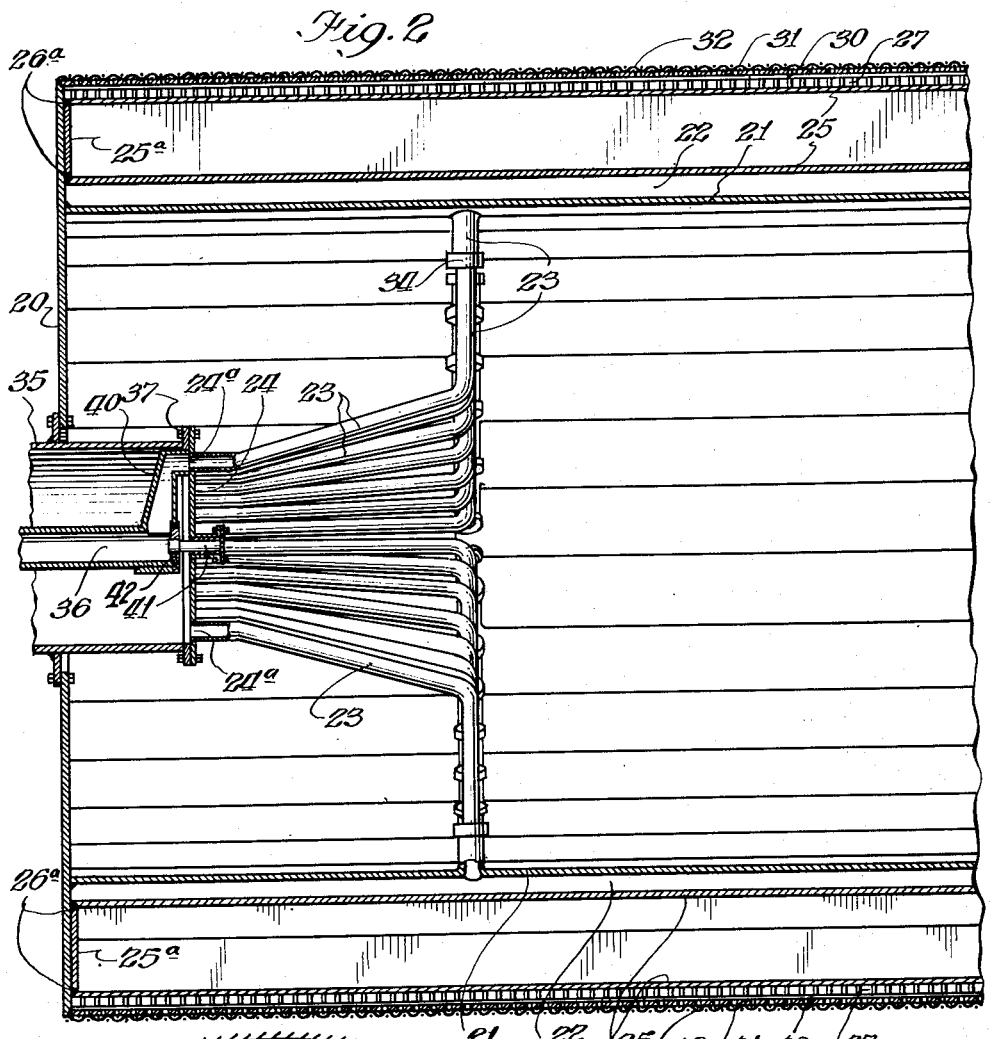
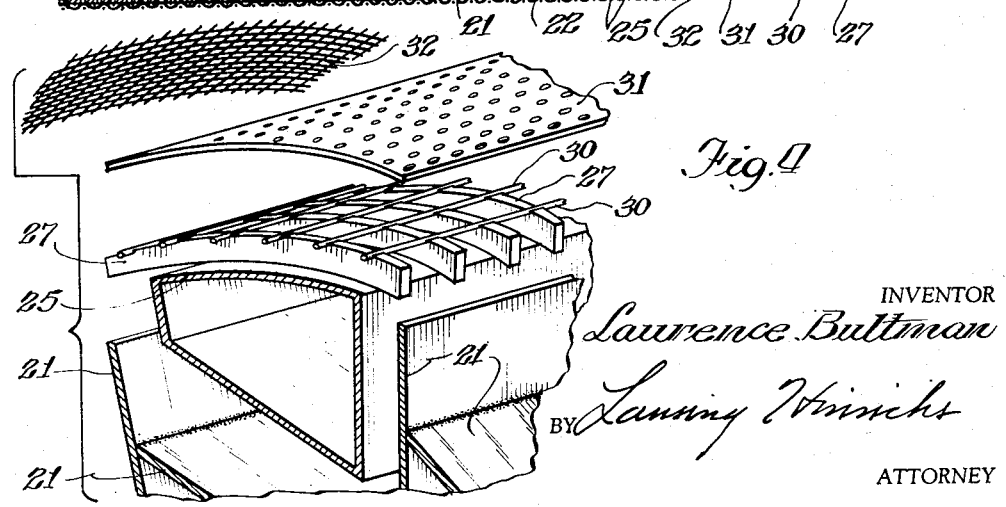
INVENTOR
Laurence Bultman
BY Lanny Hinrichs
ATTORNEY United States Patent Office 2,696,309
Patented Dec. 7, 1954

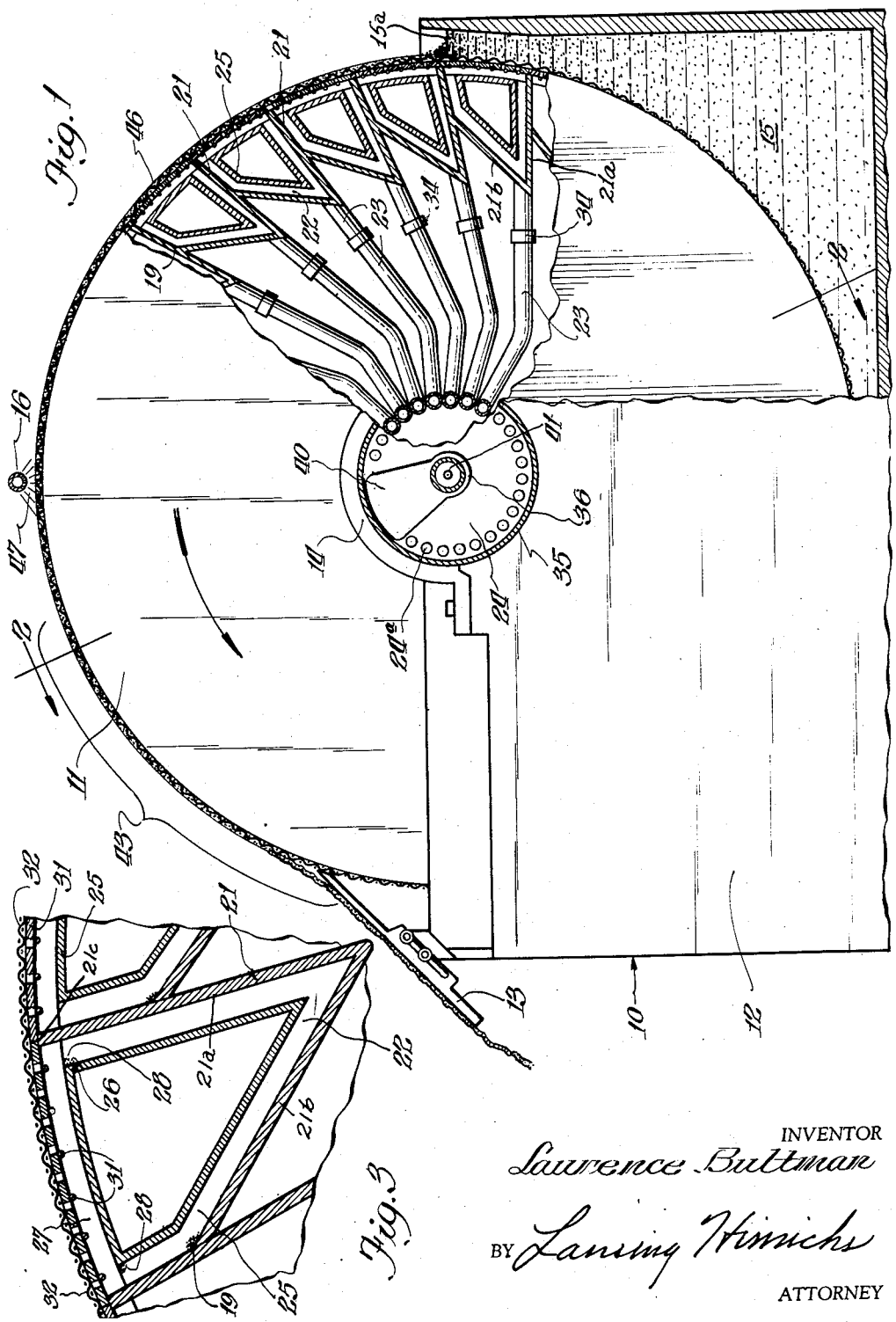

2,696,309

ROTARY DRUM FILTER

Laurence Bultman, Riverdale, Ill.

Application June 22, 1950, Serial No. 169,688

11 Claims. (Cl. 210—199)

This invention relates generally to continuous rotating drum type filters and more particularly to an improved form of drum especially adapted for use in pulp washing machines.

Rotating drum filters and washers for continuously removing solids from a slurry have been in use for many years. Such filters usually comprise a rotating cylindrical drum whose outer surface is covered with a filter cloth or screen, a feed box in which a portion of the drum is submerged, and means for producing a vacuum inside the drum to cause the depositing of the solids on the drum surface and to remove the filtrate therefrom. The filter cake may be removed by a fixed scraper blade, by pressure applied inside the drum over a selected area, or both. If desired, the filter cake may be washed one or more times before it is removed from the drum.

Pulp washing machines are substantially the same as filters in construction and operation, being generally made in larger sizes and having means for washing the "cake" of pulp fibers. The pulp fibers are somewhat more difficult to remove from the drum than most solids, such as precipitated salts or other crystals and, for this reason, steam or air pressure applied beneath the filter screen is frequently employed either to completely remove the fibers from the drum surface or to loosen them for ready removal by the fixed scraper blade. In order that suction may be applied over a major portion of the drum surface while pressure is applied at another limited portion, the usual practice has been to provide individual sections or cells which extend the length of the drum dividing its surface into a large number of circumferentially spaced areas. Each section is provided with a conduit which extends to a valve plate carried by the drum at one end and which rotates in contact with a fixed valve plate having suction and pressure ports therein. Thus, as each section passes through a certain angle or rotation, pressure may be applied thereto to loosen the cake while during other portions of the revolution suction is applied.

This invention is concerned mainly with the construction of the rotating drum and particularly with the arrangement for forming the individual cells or sections on the drum surface.

An important object of this invention is to provide a drum construction which may be readily fabricated by welding, the finished drum having a high mechanical strength and a substantially true cylindrical surface, either to eliminate the need for machining the outer surface after fabrication or to substantially reduce the amount of metal which must be removed by machining.

Another object is to provide a construction in which the individual sections are formed of longitudinally bent plates which constitute the main supporting elements of the drum structure, each section having therein a filler element for reducing its internal volume to a minimum to facilitate vacuum and pressure maintenance with the filler elements supporting and rigidifying the members which form the drum surface.

Another object is to provide a sectioned drum construction in which the shape of the section defining elements is such as to aid in the drainage of liquid therefrom during that portion of rotation when the section is rising from the feed box out of the slurry and thereafter while the volume of liquid to be removed is greatest.

Another object is to provide a drum in which virtually all welded seams are along obtuse angles facing towards the periphery of the drum and may be made from the outside of the drum structure, facilitating the welding operation and reducing the likelihood of leaks occurring as well as making any leaks which do occur easier to repair.

A further object is to provide an improved drum suitable for removal of the filter cake by pressure applied from within the drum as well as for washing of the cake prior to removal.

Other objects and advantages of this invention will present themselves to those familiar with the art on reading the following specification in conjunction with the drawings and the appended claims.

In the drawings:

Fig. 1 is an end elevation, partially in section, of a pulp washer constructed according to this invention;

Fig. 2 is a section of one end of the drum taken on line 2—2 of Fig. 1;

Fig. 3 is an enlarged view of a portion of the drum showing the cell construction; and Fig. 4 is an exploded view showing the manner in which the parts of the cell are assembled.

A pulp washer 10 provided with a drum 11 of this invention is shown in Fig. 1 of the drawings. The washer comprises a rectangular feed box 12, a rotating drum 11, and a scraper or doctor blade 13 to effect removal of the pulp from the drum. The drum 11 is rotatably mounted in a pair of trunnions 14, one on each end of the feed box 12, and means (not shown) is provided for conducting the pulp slurry 15 to the feed box to the working level 15a shown in Fig. 1. At the top of the drum a stationary spray pipe 16 is mounted which sprays wash water over the filter cake as the surface of the drum passes beneath the pipe 16.

The auxiliary equipment, which has not been shown, comprises a driving motor and reduction gear located at the opposite end of the drum, a suction pump for maintaining a vacuum within the drum, and a steam or compressed air conduit for supplying gas under pressure to the drum for the purpose of dislodging the pulp cake therefrom. The structure described thus far is substantially conventional and, of course, may be modified to satisfy particular problems, depending upon the material to be filtered, whether the filtrate is to be saved or not, etc.

The ends of the drum 11 are formed by heavy circular plates 20 which are rotatably journalled on the trunnions 14. These plates not only seal the ends of the drum but also support the longitudinal elements 21 and 25 which define the individual sections or cells 22 on the surface of the drum. Each of the elements 21 extends the full length of the drum, its ends being welded to the end plates 20 to form a tight seal. The elements 21 are formed by bending elongated plates approximately at the middle on about a 45° included angle, as shown in Fig. 3. As shown in Fig. 1 each element 21 is disposed at a slight angle of preferably approximately 10°, more if desired with respect to the radius of the drum at that point so that one arm of the V provides a trailing sidewall 21a for cell space 22 ahead of it defined in part by the other arm 21b and extends to the outer surface of the drum where it provides an outer edge to form a trailing edge 21c for the cell 22 ahead of it as determined by the direction of rotation while the end of the other arm lies in contact with the like member 21 ahead of it forming the trailing sidewall of the adjacent next preceding cell 22. At the point of contact between the adjacent elements 21 they form an obtuse angle facing the periphery of the drum where they are welded together quite easily, as indicated at 19, to seal off each cell from the central portion of the drum. Thus each individual cell is substantially a triangular or trapezoidal cross-sectionally shaped channel which extends the full length of the drum 11 and is sealed from the interior of the drum as well as from the adjacent cells.

To provide for pumping filtrate and wash water as well as air out of the cells and to permit the application of pressure to the cells, each cell is provided with a conduit 23 which extends from the bottom of the cell to one of a plurality of circular openings 24a provided in a valve plate 24 located near one end of the drum. During the process of forming filter cake on the surface of the drum as well as during the washing process, the filtrate as well as any air that passes into the cells is sucked out of the cells through the conduits 23. On the other hand, during the removal process when the filter cake is stripped from the drum, steam is blown through the conduits 23 into the cells.

To facilitate attachment of the conduits 23 to the individual cells, each conduit is formed of two pipes and has two bends therein so that it is connected to its cell approximately parallel to the cell wall and so that the pipes approach the valve plate 24 approximately along perpendicular.

To reduce the volume which must be evacuated, a filler element 25 is provided in each of the cells 22. These elements also serve to support the elements forming the drum surface. Each of the filler elements is formed of a single strip of plate material which is bent to form a substantially trapezoidal channel preferably closely following the shape of the elements 21 and a trapezoidal end plate 25a welded as indicated at 26 and 26a to seal the interior of the channel. The ends of the elements 25 are welded to the end plates 20 in the same manner as the cell-forming elements 21. The portion of the element 25 which lies at the outside of the drum may be given a slight curvature so as to follow or be connected with the contour of the drum, if desired, but this is not absolutely necessary.

At the outside of each cell a plurality of arcuate grating bars 27 are provided, as shown in Fig. 4. These bars span the open top of the cells and extend from one member 21 to the adjacent member. If the drum surface is to be maintained very close to a true cylindrical surface the outer edges of the bars 27 may be machined to have a true arcuate contour prior to assembly with the drum. Each arcuate bar is preferably welded to the filler element 25 at the edges of the element, as indicated at 28. Thus the bars 27 are rigidly attached to the closed channel elements 25 which are in turn welded to the end plates 20. Each of the arcuate bars 27 is cut out at spaced points along its outer edge and longitudinal grating bars 30 are welded thereto. These bars in turn support relatively thin perforated plates 31 which close the tops of the cells 22. The filter screen or cloth 32 is wrapped around the perforated plates 31 and held in place by a wire (not shown) which is wrapped around the drum in a spiral in the conventional manner. From the foregoing it will be apparent that the drum structure is extremely strong for its weight, the various plates in the drawings being exaggerated in thickness in order to better illustrate their shape. Actually by using the cell structure of this invention it is possible to employ relatively thin plate material throughout the longitudinal elements of the drum.

Also, it will be readily apparent that all of the welded seams with the exception of those connecting the short pipes of the conduits 23 to the elements 21 may be made from outside the drum. Since each of the conduits 23 is formed of two pipe sections which are joined by conventional couplings 34, the latter seams may be welded before the drum is assembled, and the individual pipes may be connected after the outer portions of the drum have been completed.

It will also be apparent that the method of fabrication of the drum is such that it may be readily held to a true cylindrical shape during its fabrication, any slight variations being corrected by welding the filler elements 25 and arcuate bars 27 so that their outer edges describe a true cylinder regardless of whether the outer edges 21c of the elements 21 are exactly aligned or not. The attachment of the grating bars directly to the filler elements 25 facilitates this end since the arcuate bars 27 may be cut a trifle short of the optimum cell mouth dimension. The bars 27 need not extend all the way to the edges of the cells.

Another advantage of the construction of this invention is that the drum may be built up first by tack welding all of the cell-forming elements 21 in place and checking the outer surface defined by their edges before completely welding all of the seams 19. This makes it possible to follow any desired welding sequence to reduce the possibility of distorting the structure. The amount of welding involved in securing the ends of the filler elements 25 is not sufficient to effect appreciable distortion.

Any conventional arrangement for attaching the ends of the drum to the bearing elements which are supported in the trunnions 14 may be employed, one of the trunnions being the driving connection and the other having coaxial conduits 35 and 46 therein for water which is pumped out of the drum and steam or air which is introduced to the drum. In this embodiment the conduit 35 is attached to the drum, serving as a bearing surface therefor. A ring-shaped element at the inner end of the conduit 35 is bolted to the valve plate 24. A conventional swivel joint (not shown) is provided to connect the pipe 35 to a stationary conduit leading to the vacuum pump.

The conduit 36 is stationary and terminates in a radially offset, stationary element 40 which covers certain holes in the valve plate 24 as they rotate past this element. This conduit is centered by a small shaft 41 journalled in a bearing 42 attached to the plate 24. Thus suction is applied to the majority of the pipes 23 which are in open communication with the interior of the suction line 35 while pressure may be applied to those of the pipes which are disposed in alignment with the element 40 connected to the pressure line 36. The preferred location of the element 40 with respect to the doctor blade 13 and spray pipe 16 is shown in Fig. 1, the location of those cells 22 which have pressure applied thereon being indicated by and included within the angle indicated by the bracket 43 in Fig. 1. It will be noted that the pressure is applied to the cells after the washing operation is completed, immediately prior to and during the time when the cells pass by the scraper blade 13 as the drum rotates in a counterclockwise direction as shown in Fig. 1.

The operation of the above described pulp washer is as follows: The pulp slurry is continuously discharged into the feed box 12 to the working level 15a shown in Fig. 1 and, as the drum rotates, suction is applied to all those of the cells 22 which are not in alignment with the offset element 40. Thus the liquid filtrate is drawn in through the filter screen 32 carrying the pulp fibers along with it and causing them to be deposited on the surface of the drum 11 as a cake 46. As the drum rotates, the cake is lifted out of the feed box and passes beneath the wash pipe 16 where it is sprayed with wash water, indicated at 47, the wash water being sucked through the cake to wash away remaining filtrate, and into the cells 22. It will be noted from the drawings that the wall 21 to the extent that it serves as a trailing sidewall 21a for the cell 22 ahead of it in the direction of rotation is so arranged that it preferably is horizontal while the cell 22 ahead of it is still below the working level 15a of the slurry 15 and that during the time the cells are rising out of the feed box, when the volume of liquid to be removed therefrom is greatest, the trailing walls 21a of the cells successively with rotation begin and increasingly become more inclined from the horizontal and also the pipes 23 so that liquid is free to flow straight down the side walls 21 of the cells 22 into the pipes 23, a minimum of resistance being offered to this flow so that gravity actually assists in the suction operation and prevents the flooding of the cells 22. Thus is provided an arc of over 135° of rotation in which drainage is effective before the next operation is performed which will now be described.

After the washing is completed and the wash water has also been drawn into the drum, steam pressure is applied to the cells through the conduit 36 and the element 40 as the corresponding pipes 23 are rotated into communication with the element 40 before the filter cake reaches the doctor blade 13. Thus the filter cake is blown free of the screen 32, and the function of the doctor blade 13 is more like that of a chute than a stripping blade. This is particularly important when fibrous materials are being stripped from the drum, for the fibers cannot become entangled and matted at the end of the blade 13 to offer resistance to drum rotation. As soon as the cells pass by the blade 13 they are again brought into communication with the suction line 35, with the result that by the time they again dip into the feed box, suction is present therein which causes more pulp to be deposited.

From the foregoing it will be apparent that a very superior drum construction has been provided possessing many advantages over the constructions employed heretofore and fulfilling the objects of the invention.

Various changes or modifications in addition to those set forth herein, and particularly the adaptation of the drum of this invention for use in filtering apparatus as contrasted with the pulp washer herein described, may be made without departing from the spirit of this invention whose scope is commensurate with the following claims.

What is claimed is:

1. A rotary drum filter comprising a pair of circular end plates, a plurality of cross-sectionally V-shaped plates welded at their ends to the end plates and to each other along their edges, said V-shaped plates defining a plurality of circumferentially spaced cells, each of said cells having a straight side disposed at a small angle to a radius on the end plates and a bottom portion extending outwardly from the inside edge of the first mentioned side to a line spaced inwardly from the outer periphery of the drum on the opposite side of the adjacent cell whereby the sectional contour of each cell is substantially trapezoidal; a filler element for each cell supported by the end plates in sealed relationship and disposed approximately in the middle of the cell with its sides closely following the contour of the sides of the cell, and means supported by the filler element spanning the open side of each cell for supporting a filter screen.

2. In a rotary drum filter, a drum comprising a pair of circular end plates, a plurality of cross-sectionally V-shaped plates welded to the end plates and to each other, said V-shaped plates defining a plurality of circumferentially spaced cells about the periphery of the drum, each of said cells having a straight side disposed at a small angle to a radius and a bottom portion extending outwardly from the inside edge of the first mentioned side to a line spaced inwardly from the outer periphery of the drum on the opposite side of the adjacent cell whereby the sectional contour of each cell is substantially trapezoidal; a filler element for each cell supported by the end plates and disposed approximately in the middle of the cell, means connecting each of said cells to a device for producing a vacuum, and a plurality of arcuate grating bars mounted upon the filler elements and spanning the open side of each cell for supporting a filter screen on the outer surface of the cylindrical drum thus formed.

3. In a rotary drum filter, a drum comprising a pair of circular end plates, means for rotatably supporting the end plates on fixed trunnion bearings, a plurality of cross-sectionally V-shaped plates welded to the end plates and to each other, said V-shaped plates defining a plurality of cells about the periphery of the drum, each of said cells having a straight side disposed at a small angle to a radius at this point and a bottom portion extending outwardly at an angle of approximately 45° from the inside edge of the first mentioned side to a line spaced inwardly from the outer periphery of the drum on the opposite side of the adjacent cell; a filler element for each cell supported by the end plates and disposed approximately in the middle of the cell, means connecting each of said cells to a device for producing a vacuum, and a filter screen spanning the open side of each cell.

4. In a rotary drum filter a drum comprising a pair of circular end plates, means for rotatably supporting the end plates on fixed trunnion bearings, a plurality of cross-sectionally V-shaped plates welded to the end plates and to each other, said V-shaped plates defining a plurality of circumferentially spaced cells about the periphery of the drum, each of said cells having a straight side disposed at a small angle to a radius and a bottom portion extending outwardly from the inside edge of the first mentioned side to a line spaced inwardly from the outer periphery of the drum on the opposite side of the adjacent cell whereby the sectional contour of each cell is substantially trapezoidal; a filler element for each cell supported by the end plates and disposed approximately in the middle of the cell, means connecting each of said cells to a device for producing a vacuum, and means spanning the open side of each cell for supporting a filter screen.

5. A rotary drum filter comprising a feed box, a rotary drum mounted for rotation in said feed box on an axis below the top of the feed box, and means for removing filter cake from said drum at a point above said feed box, said drum comprising a pair of end plates, longitudinal V-shaped elements welded in sealed relationship to said end plates and to each other along their edges to divide the periphery of the drum into a plurality of individual cells, and outlet means for conveying liquid from said cells, each of said cells having sidewalls inclined to radii passing through them and bottom wall inclined to a radius passing through it, the inclination of the trailing sidewall of each cell as the drum is rotated being approximately 10° and such that the wall is horizontal at the time when the cell is still below the level of said axis and the leading bottom wall contiguous therewith is inclined at approximately 45° with respect to the trailing sidewall.

6. A rotary drum filter assembly comprising a feed box, a rotary drum mounted for rotation about an axis below the fill limit of said feed box, and means for removing filter cake from said drum at a point above said feed box, said drum comprising a pair of end plates, longitudinal V-shaped elements of uniform cross-sectional contour throughout their length welded in sealed relationship to said end plates and to each other to divide the periphery of the drum at their outer edges into a plurality of individual cells, and outlet means for conveying liquid from said cells, each of said cells having sidewalls inclined to radii of the drum passing through them at approximately 10° and a bottom wall inclined to a radius passing through it, the trailing sidewall of each cell being also substantially parallel to a radius drawn to the outer edge of the trailing sidewall of the cell ahead intersecting at the periphery of said plates, and the bottom wall of each cell making an angle of approximately 45 degrees with the trailing sidewall of that cell.

7. A rotary drum filter assembly comprising a feed box, a rotary drum mounted for rotation about an axis below the top of the feed box in said feed box, and means for removing cake from said drum at a point above said feed box, said drum comprising a pair of end plates, longitudinal V-shaped elements welded in sealed relationship to said end plates and to each other to divide the periphery of the drum into a plurality of longitudinally disposed individual cells, and outlet means for conveying liquid from said cells, each of said cells having sidewalls inclined to radii passing through them, the inclination of the trailing sidewall of each cell as the drum is rotated being approximately 10° and such that the wall is horizontal at a time when the cell is still below said axis.

8. In a rotary drum filter assembly a rotary drum comprising a pair of substantially circular end members, a plurality of cross-sectionally V-shaped elements each defining individual cells on the periphery of the drum in which the trailing side wall of each cell is inclined to the radius of the drum at that point as much as 10° with the outer edge of the trailing side wall leading in the direction of rotation of the drum, a filler element for each of the first mentioned elements comprising a plate folded longitudinally to form a closed channel whose ends are supported by the end members, one of said filler elements being disposed in each of said cells to reduce the volume thereof, grating assemblies having substantially arcuate outer contours for each of said cells, each grating assembly being supported by the filler element and closing the open mouth of a cell, and an outlet means for withdrawing liquid from each of said cells.

9. A rotary drum filter for a slurry tank comprising a pair of substantially circular end members, means for journalling the end members on the slurry tank, a plurality of circumferentially spaced cross-sectionally V-shaped channel elements welded at their ends to the end members and opening radially outwardly, said channel elements being longitudinally welded to each other to divide the surface of the drum into individual sections having leading and trailing side walls with the trailing side wall of each section inclined at approximately 10° to a radius passing through it and the outer edge of the trailing wall leading in the direction of rotation of the drum, a filler element comprising a plate bent to form a closed channel disposed in each of said sections and closely following the contour thereof, and a filter screen spanning each of said sections and supported by the filler element.

10. In a rotary drum filter, a drum comprising a pair of circular end plates, means for rotatably supporting the end plates on fixed trunnion bearings, a plurality of cross-sectionally V-shaped plates welded to the end plates and to each other, said V-shaped plates defining a plurality of cells about the periphery of the drum, each of said cells having a straight side on the trailing side thereof disposed at a small angle to a radius at this point and a bottom portion extending outwardly at an angle of approximately 45° from the inside edge of the first-mentioned side to a line spaced inwardly from the outer periphery of the drum on the opposite side of the adjacent cell; a filler element for each cell supported by the end plates and disposed approximately in the middle of the cell, and having its outer face paralleling the periphery of the drum and spaced inwardly from the outermost edge of said straight side, means connecting each of said cells to a device for producing a vacuum including a conduit opening into said cell at the bottom of the cell proximate to the inner edge of said straight side, and a filter screen spanning the open side of each cell.

11. A rotary drum filter comprising a pair of substantially circular end members, a plurality of cross-sectionally V-shaped elements defining individual cells and extending from one member to the other, the elements being circumferentially spaced and connected to one another along their sides and to the end members to seal the interior of the drum formed thereby from the cells, the sealed periphery of said drum being formed solely by the V-shaped elements in which the trailing side wall of each cell is disposed at approximately 10° to a radius of the drum at that point with the outer edge of the trailing side wall leading in the direction of rotation, a filler element for each of the first mentioned elements comprising a plate folded longitudinally to form a closed channel whose ends are supported by the end members and whose sides closely follow the contour of said cells, one of said filler elements being disposed in each of said cells to reduce the volume thereof, and outlet means for withdrawing liquid from each of said cells at the innermost edges of said trailing side walls.

References Cited in the file of this patent

UNITED STATES PATENTS

| Number | Name | Date |
|---|---|---|
| 1,590,233 | Frick | June 29, 1926 |
| 1,667,465 | Wait | Apr. 24, 1928 |
| 1,748,081 | Reed et al. | Feb. 25, 1930 |
| 1,887,143 | Spencer et al. | Nov. 8, 1932 |
| 1,892,306 | Hillier | Dec. 27, 1932 |
| 2,362,300 | Nyman | Nov. 7, 1944 |
| 2,461,824 | Komline | Feb. 15, 1949 |